United States Patent
Goldberg et al.

(10) Patent No.: US 8,098,716 B2
(45) Date of Patent: Jan. 17, 2012

(54) METHOD AND APPARATUS FOR PROVIDING AN ENERGY-BASED SIGNAL TRACKING LOOP

(75) Inventors: Jason Goldberg, Menlo Park, CA (US); Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 371 days.

(21) Appl. No.: 12/014,410

(22) Filed: Jan. 15, 2008

(65) Prior Publication Data

US 2008/0112516 A1   May 15, 2008

Related U.S. Application Data

(63) Continuation-in-part of application No. 11/716,118, filed on Mar. 9, 2007, which is a continuation-in-part of application No. 10/690,973, filed on Oct. 22, 2003, now Pat. No. 7,567,636, which is a continuation of application No. 10/394,404, filed on Mar. 21, 2003, which is a continuation-in-part of application No. 09/900,499, filed on Jul. 6, 2001, now Pat. No. 6,704,348, and a continuation-in-part of application No. 09/861,086, filed on May 18, 2001, now Pat. No. 6,606,346, which is a continuation-in-part of application No. 09/963,345, filed on Sep. 26, 2001.

(51) Int. Cl.
*H04B 1/707* (2011.01)
(52) U.S. Cl. ........................................ 375/150
(58) Field of Classification Search ................ 375/142, 375/144, 148, 150
See application file for complete search history.

(56) References Cited

U.S. PATENT DOCUMENTS

| | | | |
|---|---|---|---|
| 4,527,278 A | 7/1985 | Deconche et al. |
| 5,090,028 A | 2/1992 | Crebouw |
| 5,426,665 A | 6/1995 | Cleverly et al. |
| 5,579,338 A | 11/1996 | Kojima |
| 5,600,670 A | 2/1997 | Turney |
| 5,663,734 A | 9/1997 | Krasner |
| 5,727,018 A | 3/1998 | Wolf et al. |
| 5,901,171 A | 5/1999 | Kohli et al. |
| 5,931,893 A | 8/1999 | Dent et al. |
| 5,966,402 A | 10/1999 | Yamamoto |
| 6,005,899 A | 12/1999 | Khayrallah |

(Continued)

FOREIGN PATENT DOCUMENTS

WO    WO 03/010912    2/2003

OTHER PUBLICATIONS

Sriram, Sundararajan, et al., "Low-power Correlator Architectures for Wideband CDMA Code Acquisition," Wireless Communications, Texas Instruments, Dallas, Texas, IEEE, pp. 125-129, 1999.

(Continued)

*Primary Examiner* — Kevin Kim (74) *Attorney, Agent, or Firm* — McAndrews, Held & Malloy, Ltd.

(57) ABSTRACT

A method and apparatus for tracking a signal comprises correlating a digital signal with a code using a hypothesis at a plurality of frequencies and at least one delay to produce correlation results, measuring an energy value of the correlation results, adjusting at least one of the frequency or delay in response to the measured energy value to form the hypothesis.

31 Claims, 5 Drawing Sheets

U.S. PATENT DOCUMENTS

| | | | |
|---|---|---|---|
| 6,118,808 | A | 9/2000 | Tiemann et al. |
| 6,289,041 | B1 | 9/2001 | Krasner |
| 6,298,083 | B1 | 10/2001 | Westcott et al. |
| 6,363,108 | B1 | 3/2002 | Agrawal et al. |
| 6,370,208 | B1 | 4/2002 | Kuo et al. |
| 6,542,820 | B2 | 4/2003 | LaMance et al. |
| 6,560,534 | B2 | 5/2003 | Abraham et al. |
| 6,775,319 | B2 | 8/2004 | King et al. |
| 6,804,290 | B1 | 10/2004 | King et al. |
| 6,829,535 | B2 | 12/2004 | van Diggelen et al. |
| 7,372,400 | B2 * | 5/2008 | Cohen et al. ............. 342/357.01 |
| 2003/0023379 | A1 | 1/2003 | Diggelen et al. |
| 2004/0258140 | A1 * | 12/2004 | Ramberg et al. ............. 375/148 |

OTHER PUBLICATIONS

"The Digital Signal Processing Handbook," Section 8.5: Multirate Methods for Running Convolution, pp. 8-12-8-14, 1998.

Expert Report of Stephen Heppe Regarding Invalidity of U.S. patent Nos. 6,417,801, 6,606,346, 6,651,000, 6,704,651, 6,937,187, and 7,158,080, Feb. 25, 2008.

First Supplemental Report of Dr. Stephen Heppe Regarding Invalidity of U.S. Patent Nos. 6,417,801, 6,606,346, 6,937,187 and 7,158,080, Apr. 4, 2008.

Respondent SiRF Technology, Inc.'s First Supplemental Objections and Responses to Global Locate, Inc.'s First Set of Interrogatories (Nos. 22, 23 and 49) and Exhibits 6-7, Aug. 24, 2007.

Respondent SiRF Technology, Inc.'s Sixth Supplemental Objections and Responses to Global Locate, Inc.'s First Set of Interrogatories (Nos. 19, 21-23, and 27-28), Apr. 3, 2008.

Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 6-7, Aug. 31, 2007.

Respondents' (Mio Technology Limited, USA; MiTAC International Corporation; Pharos Science & Applications, Inc.; E-TEN Information Systems Co. Ltd.) Fifth Supplemental Objections and Responses to Global Locate, Inc.'s First Set of Interrogatories (Nos. 19, 21-23 and 27-28), Apr. 3, 2008.

Melbourne, W.G., et al. "Scientific Applications of GPS on Low Earth Orbiters," Jet Propulsion Laboratory, California Institute of Technology, http://hdl.handle.net/2014132419, 1994.

Young, L., et al. "GPS Precision Orbit Determination: Measured Receiver Performance," Jet Propulsion Laboratory, California Institute of Technology, http://hdl.handle.net/2014135887, 1993.

Chansarkar, M., et al. "Acquisition of GPS Signals at Very Low Signal to Noise Ratio," ION NTM 2000, Anaheim, CA, pp. 731-737, Jan. 26-28, 2000.

Lamance, J., et al. "Assisted GPS—Low Infrastructure Approach," GPS World, vol. 13, No. 3, pp. 46-51, Mar. 2002.

Spilker Jr., J.J., et al. "Overview of GPS Operation and Design," Global Positioning System: Theory and Applications vol. I, Progress in Astronautics and Aeronautics, vol. 163, Ch. 2, pp. 29-55, 1996.

Aparicio., M., et al. "GPS Satellite and Payload," Global Positioning System: Theory and Applications vol. I, Progress in Astronautics and Aeronautics, vol. 163, Ch. 6, pp. 209-244, 1996.

File History—U.S. Appl. No. 10/081,164, filed Feb. 22, 2002.

Yiu, K., et al. "A Low-Cost GPS Receiver for Land Navigation," Global Positioning System, Hewlett-Packard Laboratories, Palo Alto, CA, pp. 44-60, May 1982.

Initial Determination, Certain GPS Devices and Products Containing Same, United States International Trade Commission Investigation No. 337-TA-602, Public Version, Nov. 25, 2008.

Rebuttal Expert Report of Michael S. Braasch, Ph.D., P.E., Regarding Validity of U.S. Patent No. 6,606,346, Redacted—Non-Confidential Version, Mar. 10, 2008.

Respondents' Notice of Prior Art, Certain GPS Devices and Products Containing Same, United States International Trade Commission Investigation No. 337-TA-602, Feb. 15, 2008.

Respondents' First Supplemental Corrected Notice of Prior Art, Certain GPS Devices and Products Containing Same, United States International Trade Commission Investigation No. 337-TA-602, Mar. 4, 2008.

Complainants' Notice of Prior Art Pursuant to Ground Rule 5, Certain GPS Devices and Products Containing Same, United States International Trade Commission Investigation No. 337-TA-602, Feb. 15, 2008.

Commission Investigative Staff's Notice of Prior Art, Certain GPS Devices and Products Containing Same, United States International Trade Commission Investigation No. 337-TA-602, Feb. 15, 2008.

Wolfert, S. et al. "Rapid Direct P(Y)-Code Acquisition in a Hostile Environment," Software Technology and Systems, Sensors Directorate, Air Force Research Lab, pp. 353-360, Sep. 15-18, 1998.

Lyusin, S., et al. "Fast Acquisition by Matched Filter Technique for GPS/GLONASS Receivers," Magellan Corp. Moscow Dev. Center, pp. 307-315, Sep. 15-18, 1998.

Namgoong, W., et al., "An All-Digital If GPM Synchronizer for Portable Applications," in Digest of Technical Papers of the 1999 IEEE International Solid-State Circuits Conference, 1999 San Francisco, CA, pp. 340-341, 476.

Complainants' First Amended Complaint under Section 337 of the Tariff Act of 1930, as Amended, Certain GPS Devices and Products Containing Same, United States International Trade Commission Investigation No. 337-TA-602, Feb. 8, 2008.

Commission Opinion, Certain GPS Devices and Products Containing Same, United States International Trade Commission Investigation No. 337-TA-602, Jan. 27, 2009.

*SiRF v. Broadcom*, U.S. Court of Appeals for the Federal Circuit, 2009-1262, decided Apr. 12, 2010.

* cited by examiner

METHOD AND APPARATUS FOR PROVIDING AN ENERGY-BASED SIGNAL TRACKING LOOP

CROSS-REFERENCE TO RELATED APPLICATIONS

This application is a continuation-in-part of co-pending U.S. patent application Ser. No. 11/716,118, filed Mar. 9, 2007 which is a continuation of co-pending U.S. patent application Ser. No. 10/394,404, filed Mar. 21, 2003, which is a continuation-in-part of U.S. patent application Ser. No. 09/900,499, filed Jul. 6, 2001 (now U.S. Pat. No. 6,704,348, issued Mar. 9, 2004), which is a continuation-in-part of U.S. patent application Ser. No. 09/861,086, filed May 18, 2001 (now U.S. Pat. No. 6,606,346, issued Aug. 12, 2003) and this application is also a continuation-in-part of U.S. patent application Ser. No. 10/690,973 filed Oct. 22, 2003 now U.S. Pat. No. 7,567,636, which is a continuation-in-part of co-pending U.S. patent application Ser. No. 09/963,345, filed Sep. 26, 2001, which is a continuation-in-part of U.S. patent application Ser. No. 09/861,086, filed May 18, 2001, (now U.S. Pat. No. 6,606,346, issued Aug. 12, 2003), each of which are incorporated by reference herein in their entireties, each of which are incorporated by reference herein in their entireties.

BACKGROUND OF THE INVENTION

1. Field of the Invention

The following generally relates to a digital receiver and, more particularly, to a method and apparatus for providing an energy based signal tracking loop within a digital receiver.

2. Description of the Related Art

A global navigation satellite system (GNSS) typically includes multiple orbiting satellites and at least one receiver (GNSS receiver). Examples of GNSS include the global positioning system (GPS), the Galileo positioning system (GALILEO), the Global'naya Navigatsionnaya Sputnikovaya Sistema (GLONASS), and the like.

In operation, each of the satellites broadcast a radio signal (GNSS signal) upon which is modulated certain information. The GNSS receiver captures the broadcast satellite signal, extracts the information modulated upon the signal, and computes an estimate of the position of the GNSS receiver using the information. More specifically, the receiver position is determined by computing, for each satellite in view of the GNSS receiver, a time delay between the time of the transmission from the satellite and a time of reception of the satellite signal at the GNSS receiver. The time delay multiplied by the speed of light provides a distance (a pseudorange) from the GNSS receiver to the satellite. Using pseudoranges to a number of satellites, the receiver computes the position.

To enable the receiver to extract information from the GNSS signals, the carrier frequency and the code delay (which is indicative of the pseudorange) must be determined and tracked. The GNSS signal is modulated with a pseudorandom (PN) code that is correlated with a PN code in the receiver. The correlation process produces an estimate of frequency and code delay.

These estimates vary over time due to motion of the receiver relative to the satellites, satellite motion through space, clock inaccuracies, and the like. As such, time and frequency tracking loops are used. These loops utilize a discriminator that derives a time and/or frequency error and applies the error to the frequency or timing loop to compensate for the error. Such loops (e.g., phase or frequency lock loops) are well known and are widely used in GNSS receivers.

One issue that arises with the use of conventional phase or frequency tracking loops is that they rely upon a discriminator, that uses a nonlinearity. Such discriminators are not sensitive to low-signal strength signals. Consequently, at low-signal strength, conventional signal tracking loops fail.

Therefore, there is a need in the art for a tracking loop that tracks delay and frequency of low-signal strength signals.

SUMMARY OF THE INVENTION

Embodiments of the invention comprise a method and apparatus for tracking a signal comprising correlating a digital signal with a code using a hypothesis at a plurality of frequencies and at least one delay to produce correlation results, measuring energy value of the correlation results, adjusting at least one of frequency or delay in response to the measured energy value to form the hypothesis.

BRIEF DESCRIPTION OF THE DRAWINGS

So the manner which the above recited features are attained and can be understood in detail, a more detailed description is described below with reference to figures illustrated in the appended drawings.

The figures in the appended drawings, like the detailed description, are examples. As such, the figures and the detailed description are not to be considered limiting, and other equally effective examples are possible and likely. Furthermore, like reference numerals in the figures indicate like elements, and wherein.

DETAILED DESCRIPTION

Figure 1:
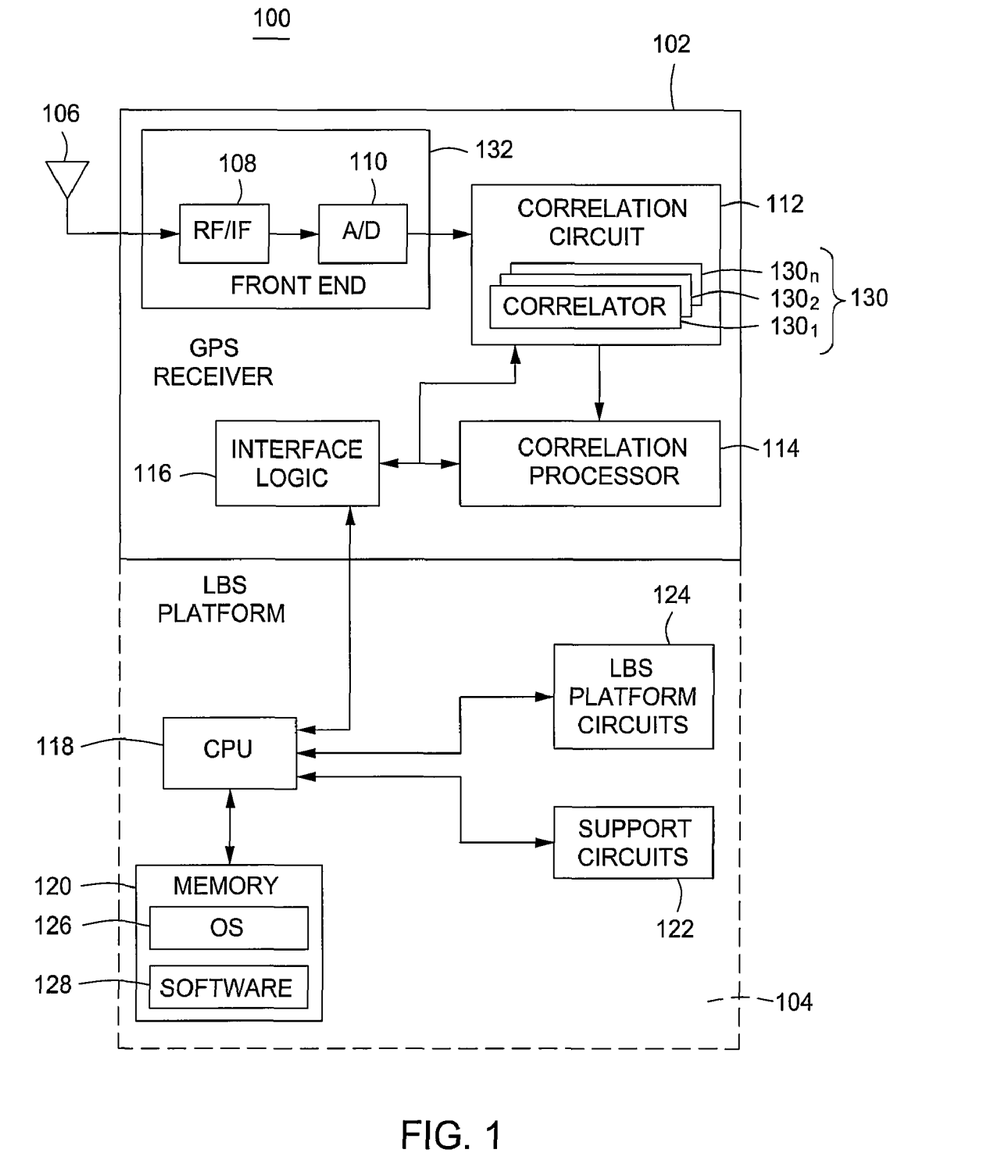
FIG. 1 is a block diagram of a GNSS receiver as used in a location based services platform.

FIG. 1 depicts a block diagram of a mobile device 100 incorporating an embodiment of the present invention. The mobile device 100 comprises a GNSS receiver 102 and a location based services (LBS) platform 104. The use of a GNSS receiver within which the invention is incorporated forms one application of the invention. Other platforms that require signal correlation may find use of the present invention.

The LBS platform 104 may comprise any computing device that is capable of executing location based services (LBS) application software such as, but not limited to, cellular telephone circuitry, a personal digital assistant device, a pager, a laptop computer, a computer in an automobile, and the like. The LBS platform 104 comprises a central processing unit (CPU) 118, support circuits 122, memory 120, and LBS platform circuits 124. The CPU 118 may comprise one or more well known microprocessors or microcontrollers. The support circuits 122 are well known circuits that support the operation and functionality of the CPU 118. The support circuits 122 may comprise clock circuits, input/output circuits, power supplies, cache, and the like. The memory 120 may comprise random access memory, read only memory, disc drives, removable memory, combinations thereof, and the like. The memory generally stores an operating system 126 and software 128 such as LBS applications that, when executed by the CPU, utilize position information supplied by the GNSS receiver 102 to provide various services to a user.

The LBS platform 104 may further include LBS platform circuits 124 that provide specific functions to the LBS platform. For example, the LBS platform circuits 124 may include a cellular telephone transceiver, a network interface card for coupling data to or from a computer network, a display, and/or other circuits that provide LBS platform functionality.

The GNSS receiver 102 receives satellite signals, correlates the signals with a locally generated code, and uses the correlation results to determine the position of the receiver. More specifically, the receiver 102 comprises an antenna 106, a receiver front-end 132, which includes a radiofrequency-to-intermediate frequency (RF/IF) converter 108, and an analog-to-digital (A/D) converter 110, a correlation circuit 112, a correlation processor 114, and interface logic 116.

Signals (such as GNSS signals) are received by the antenna 106. The RF/IF converter 108 filters, amplifies, and frequency shifts the signals for digitization by the (A/D) converter 110. The elements 106, 108, and 110 are substantially similar to those elements used in a conventional GNSS or assisted GNSS receiver. These elements generally form what is known as the front-end 132 of a receiver.

The output of the A/D 110 is coupled to a correlation circuit 112. In one embodiment, the correlation circuit 112 comprises a multichannel correlator (e.g., n correlation channels represented by correlators $130_1, 130_2, \ldots 130_n$ where n is an integer) that creates a series of correlation results. The correlators $130_1, 130_2, \ldots 130_n$ are herein collectively referred to as correlators 130. One such illustrative correlation circuit is described in commonly assigned U.S. Pat. Nos. 6,606,346 and 6,819,707, which are incorporated herein by reference in their entireties. The correlation circuits described in these patents represent one of many types of correlation circuits that could be used to correlate the received satellite signal (or portion thereof) with a locally generated code. Any correlation circuit that produces a series of correlation results can be used as a component of the present invention.

The correlation results (a stream that is generated at a first rate) are processed, in real time, by the correlation processor 114. The correlation processor 114 stores and processes sets of correlation results to rapidly estimate received signal parameters that may be used to tune the correlation circuit 112 to acquire the satellite signals, e.g., the correlation processor 114 performs a two-dimensional search regarding Doppler frequency and/or bit timing. The correlation processor 114 accesses and processes the correlation results at a second rate in one embodiment of the invention, the second rate is faster than the first rate such that the stream of correlation results from all the correlators 130 can be repeatedly processed in real time without impacting the operation of the correlation circuit 112. This information, single correlation processor 114 may process multiple channels of correlation results.

The interface logic 116 couples data and control signals between the LBS platform 104 and the GNSS receiver 102. The CPU 118 generates control signals that request the GNSS receiver 102 to start up and acquire the satellite signals. The processed signals may be coupled to the CPU 118 for further processing or transmission to a remote location (a location server) for further processing. The use of the acquired satellite signals to determine the position of the receiver is disclosed in U.S. Pat. No. 6,453,237, which is herein incorporated by reference in its entirety.

Figure 2:
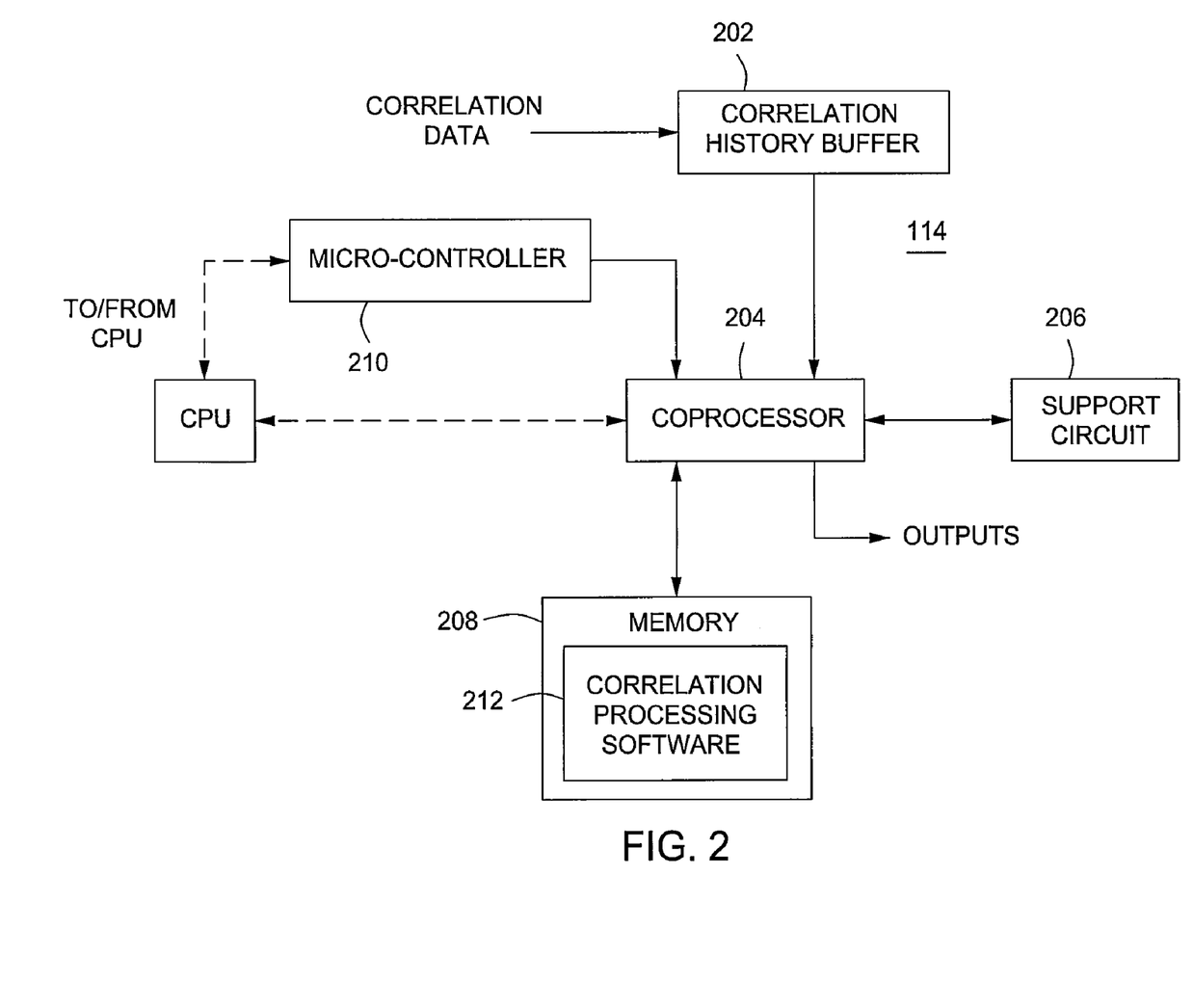
FIG. 2 depicts a block diagram of a GNSS receiver utilizing a coprocessor for processing correlation information.

FIG. 2 depicts a block diagram of the correlation processor 114. The correlation processor 114 comprises a correlation history buffer 202, a coprocessor 204, a microcontroller 210, and support circuits 208. The correlation results (a data stream) are coupled to the correlation history buffer 202, a memory having a length, for example, of 1000 samples per channel (e.g., 1 second of GPS data, where the samples are created in 1 millisecond intervals). The buffer may be any form of repeated use memories such as a circular buffer, a ping-pong buffer, and the like. The buffer stores a history of correlation results as the results are generated at a first rate by one or more correlators 130 of FIG. 1.

The history is accessed by the coprocessor 204 and processed at least once, and in all likelihood, many times to assist in rapidly tuning the correlation circuit. A single coprocessor 204 may process correlation results for a number of channels. The coprocessor 204 is supported by support circuits 208 comprising, for example, cache, power supplies, clock circuits, and the like. The coprocessor is also coupled to a memory 208 comprising random access memory, read only memory, and/or a combination thereof. The memory comprises correlation processing software 212 (instructions) that, when executed by the coprocessor 204, enhance the acquisition of satellite signals by the receiver.

In response to a request from the CPU 118 for specific information from the coprocessor, the microcontroller 210 provides program selection and sequencing signals to the coprocessor 204. Specifically, the microcontroller 210 selects the instruction set that is to be executed by the coprocessor 204 to fulfill the request from the CPU 118. The microcontroller 210 provides sequencing signals to the coprocessor 204 to step the coprocessor through the instruction set.

The coprocessor 204 and microcontroller 210 are coupled to the CPU 118 of the LBS platform 100 via the interface logic 116. As such, the CPU 118 requests information from the GNSS receiver 102 via the interface logic 116. The results of the coprocessor computation are coupled to the CPU 118 through the interface logic 116. In this manner, the CPU 118 can request information and then go on to perform other processes while the coprocessor performs the signal processing function. Thus, the CPU 118 is not burdened by the computation of GNSS signals.

Figure 3:
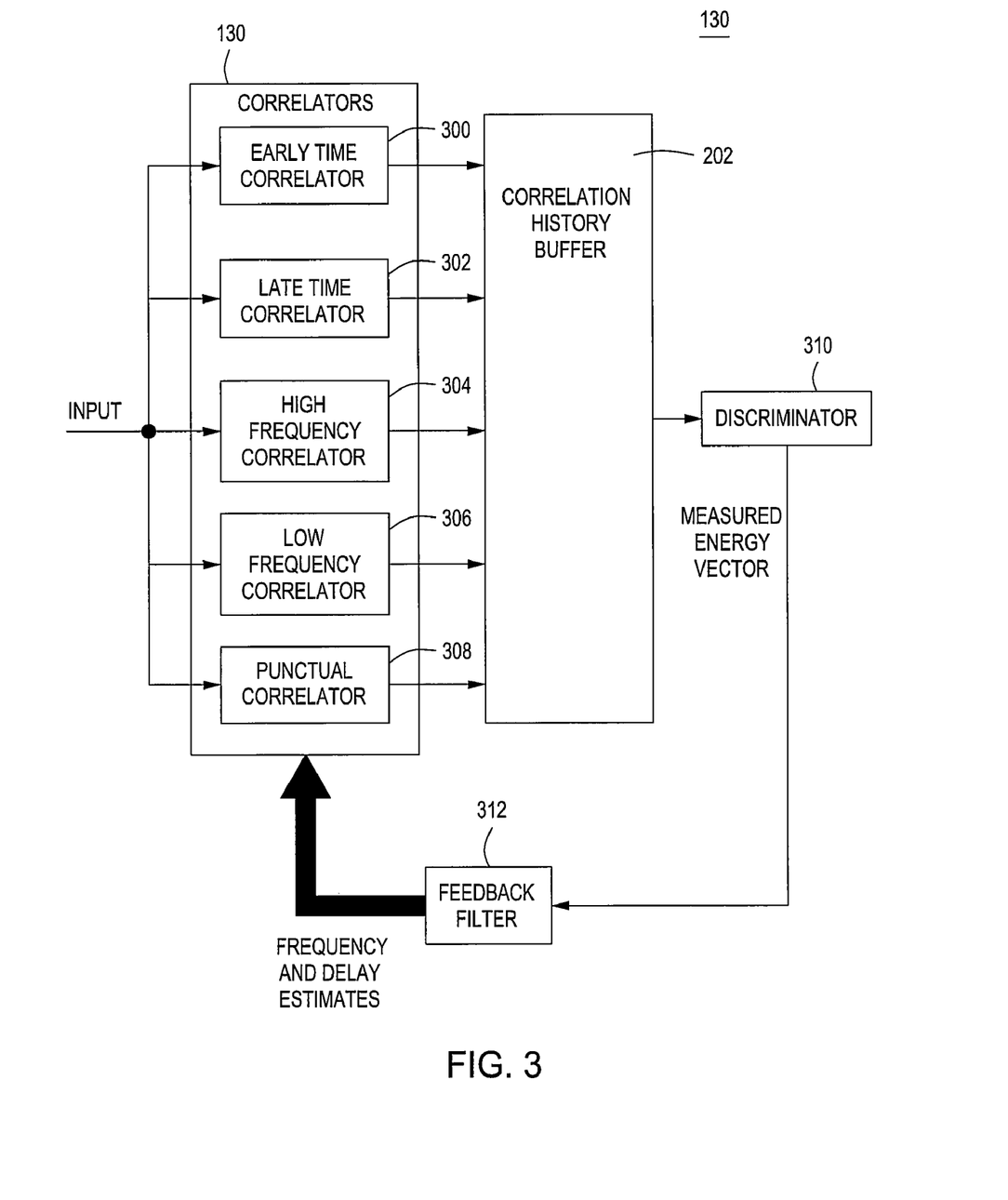
FIG. 3 depicts a block diagram of one embodiment of the present invention.

FIG. 3 depicts a functional block diagram depicting the operation of a tracking loop 300 comprising the correlators 130, the correlation history buffer 202, a discriminator 310, and a feedback filter 312. In this embodiment, the correlators 130 produce a series of correlation results that are buffered within the correlation history buffer 202. The discriminator 310 accesses the buffered correlation information; correlation data processes that information to form a measured energy vector. The measured energy vector is applied to a feedback filter 312 that produces frequency and delay estimates that are coupled to the correlators 130. The term energy (or alternatively, magnitude or amplitude) are produced by any non-linear operation that creates a quantity that is sensitive to received signal power.

In the depicted embodiment, there are five correlators operating in parallel on a given input signal. These correlators are early in time, late in time, high frequency, low frequency, and punctual. Each of the correlators produces a specific correlation output that is controlled by a frequency and delay estimate. For example, the early time correlator 300 and the late time correlator 302 operate at the same frequency estimate but have a delay estimate that is either early in time or late in time compared to the center expected time or punctual delay of the correlator 308. Similarly, the high frequency correlator 304, the low frequency correlator 306 operate at the same delay but operate with different frequency estimates for each correlator. The high and low frequencies are respectfully higher or lower than an expected frequency or the frequency used by the punctual correlator 308. Although each correlator operates on a single input signal, the outputs will vary depending on the frequency and delay estimates that are applied to each of the correlators. The correlation outputs are temporarily stored in the correlation history buffer that is then accessed by the discriminator 310.

The discriminator 310 is implemented by a software routine executing upon the coprocessor 204 of FIG. 2. In other embodiments, the discriminator 310 operates in real time on the outputs from the correlators 130 without utilizing a correlation history buffer. The discriminator 310 produces an energy level representing the energy in each correlator output. In one embodiment of the invention, the late correlation value is subtracted from the early correlation value to create a E-L correlation value. Similarly, the low frequency correlation value is subtracted form the high frequency correlation value to create an H-L correlation value. This reduces the computation space and simplifies the energy computation. The E-L correlation value (a measurement indicative of delay offset), the H-L correlation value (a measurement indicative of frequency offset) and a magnitude value are applied the feedback filter 312 as components of a vector. This measured vector is represented by these three measured quantities. These measured quantities within the measured energy vector are applied to the feedback filter 312, which updates a correction vector that is applied to the correlators 130. The correction vector adjusts the frequency and delay estimates used to create the correlation samples in an attempt to optimize the correlation process, e.g., improve the magnitude of the measured vector at a center frequency and delay value.

Figure 4:
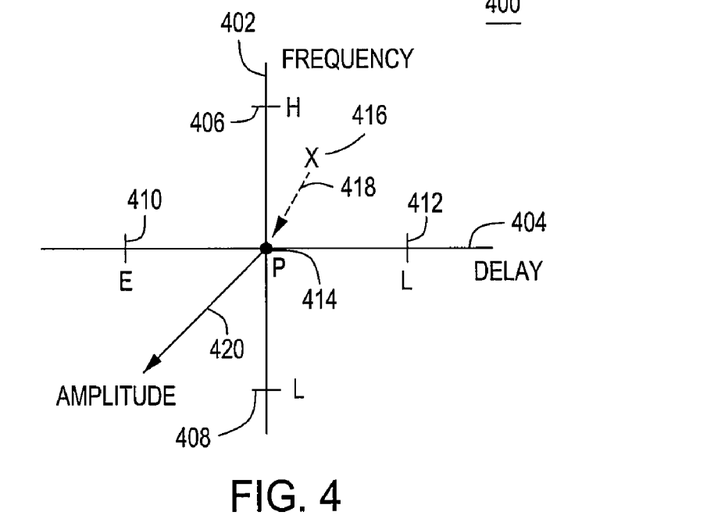
FIG. 4 depicts a graph of frequency versus delay in accordance with the present invention.

FIG. 4 graphically depicts the process used by the tracking loop 300 of FIG. 3. The multidimensional graph 400 having a first dimension along the frequency axis 402, a second dimension along the delay axis 404 and an amplitude in the Z axis 420 (extending out of the plane of the page). An early sampling location 410, a late sampling location 412, a high-frequency sampling location 406, and a low-frequency sampling location 408 are depicted on the graph 400. A typical multidimensional sample that is represented by an energy vector 418 occurs at correlation output 416. The punctual sample is at 414. In operation, the measured energy vector 418 represents the correlation output 416 as a multidimensional measurement. The current estimates of frequency, amplitude and power updated by the tracking loop 300 to have a maximum amplitude value extending from the plane of the page and located at the punctual sampling location 414. The measured energy vector is used to adjust the delay and frequency of the correlation process performed within the correlators 130 to improve the energy vector.

Figure 5:
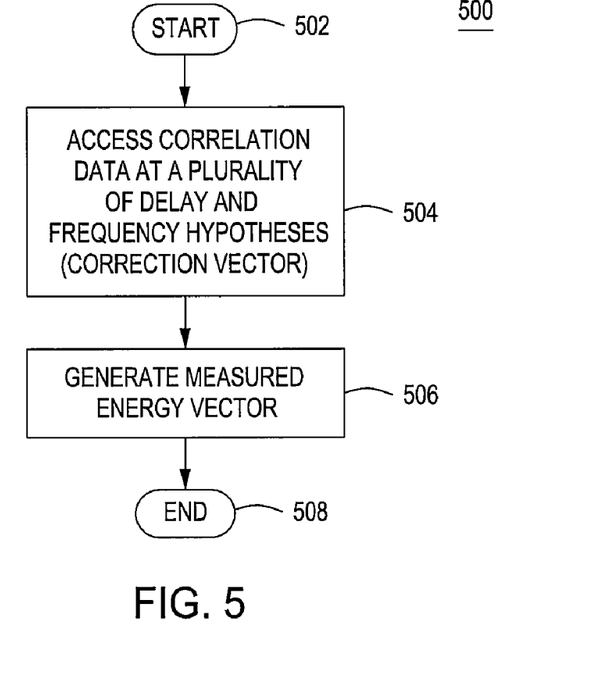
FIG. 5 depicts a flow diagram of an operation of a discriminator for producing a measured energy vector in accordance with one embodiment of the present invention.

FIG. 5 depicts a flow diagram of a method 500 of operation of the discriminator 310. The method 500 begins at step 502 and proceeds to step 504, where the correlators correlate input signals at a plurality of delay and frequency hypotheses. These correlation values may be analysed in real or stored as a correlation history as depicted. At step 506, the discriminator generates a measured energy vector containing present states. The routine ends at step 508. This method 500 is repeatedly utilized to generate a measured energy vector for each time period of the use by the correlation history buffer.

In generating the correlation data that is used by the discriminator, the depicted embodiment in FIG. 3 utilizes five correlators in parallel. Alternatively, a fewer number of correlators could be used and the data collected in the correlation history buffer may be manipulated by the coprocessor in performing the discriminator function to create correlation data at various delays and frequency hypotheses without actually controlling the correlator for each of those data points. In particular, values of correlation for offset frequencies (e.g., high frequency correlator and low frequency correlator) can be generated from a correlation history generator by a correlator operating at a single frequency. The utilization of a coprocessor in this manner is described in commonly assigned U.S. patent application Ser. No. 10/690,973 filed Oct. 22, 2003 which is incorporated by reference herein in its entirety.

Figure 6:
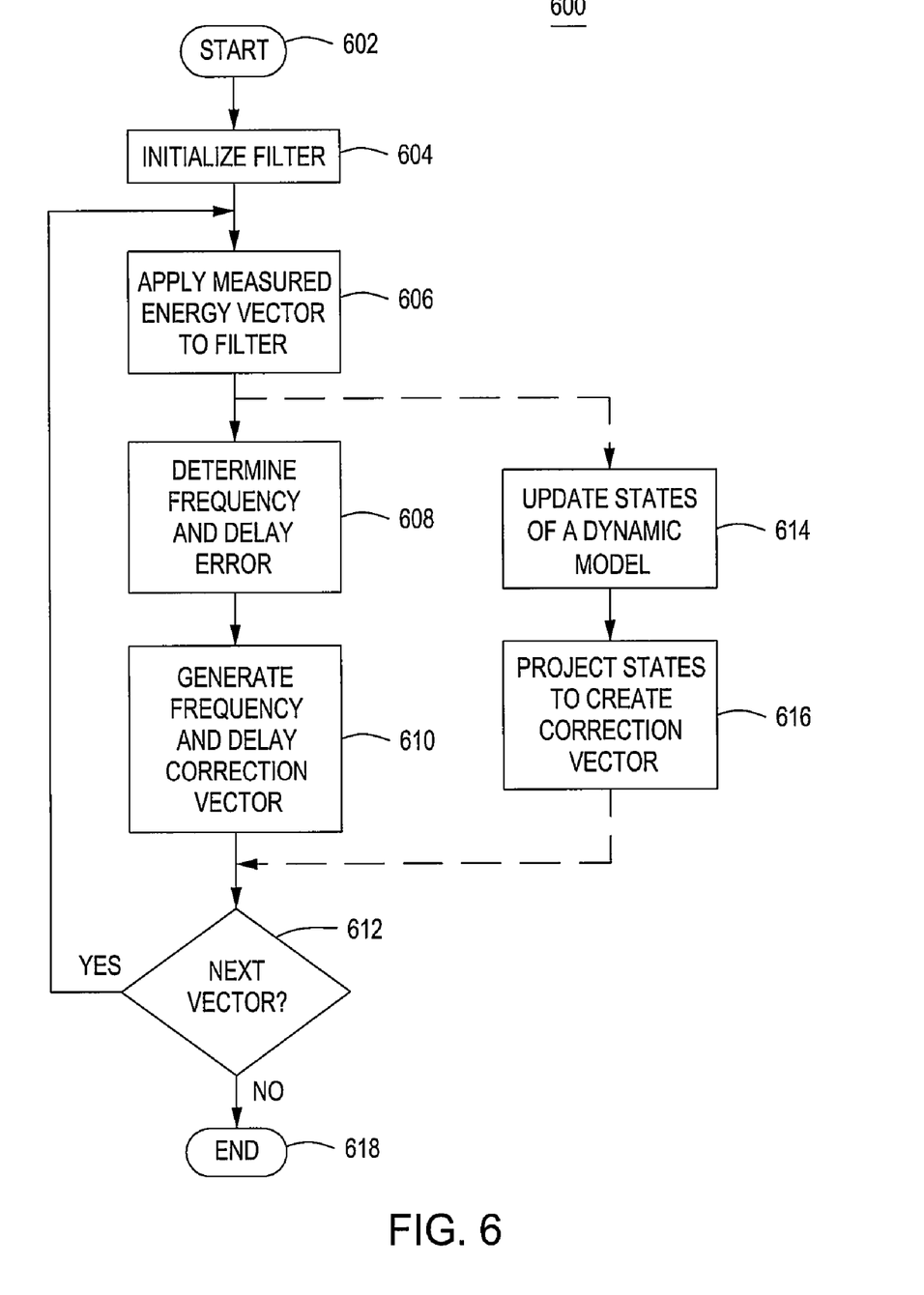
FIG. 6 depicts a flow diagram of a method of operation of one embodiment of a filter used for generating correction vectors for frequency and delay correction in accordance with one embodiment of the present invention.

FIG. 6 depicts a flow diagram of the operation of a feedback filter in accordance with one embodiment of the present invention. The method 600 begins at step 602 and proceeds to step 604, where the filter is initialized. At step 606, the method 600 applies the measured energy vector to the filter. At step 608, the method 600 determines frequency and delay utilizing the measured energy vector. At step 610, the method 600 generates a frequency and delay correction vector that is then sent to the correlators to be used to produce a new set of correlation values. At step 612, the method 600 queries whether an another vector is to be computed. If step 612 is affirmatively answered, then the method proceeds to step 606 and applies the new measured energy vector to the filter. If the query at step 612 is negatively answered, the method ends at step 618.

In the manner described above, the measured energy vector is applied to a fixed gain filter to produce an error value that is then used for generating a new frequency and delay correction vector. Although such a process facilitates the use of a measured energy vector in an energy based tracking loop to adjust the delay and frequency parameters of the correlators and optimize the sampling or the correlations, alternatively a dynamic model can be utilized. Since the variables (delay, frequency, amplitude) form a multi-dimensional problem where the variables are interdependent, the use of a dynamic model is well suited to estimating the delay and frequency to be used by the correlators to improve the energy vector.

To use a dynamic model, at step 614, the measured energy vector is applied to the filter that utilizes a plurality of states within a dynamic model. Such a dynamic model may be created using an extended Kalman filter. Extended Kalman filters are generally well known in the art and the use of them in providing a dynamic basis for filtering is well known. In this application, the energy vector provides the measured quantities that are used to alter the states of the dynamic model. These states include a frequency value, a delay value and, optionally, an amplitude value (equivalently, an energy or magnitude value). The amplitude state may be fixed, variable or provided from outside of the dynamic mode. In that sense, the amplitude state is an optional state of the dynamic model. Once the states within the dynamic model are updated utilizing the latest measured energy vector, the method 600 proceeds to step 616 wherein the dynamic model projects the states into the future to create a correction vector that will produce optimal states in the future. The correction vector is then applied to the correlators to produce a new measured energy vector.

By using the energy vector as a basis for performing frequency and delay adjustments for the correlators, the embodiments of the invention operate at extremely low input signal levels, e.g., a GNSS satellite signal can be tracked at signal strengths of up to −160 dBm. Whether using a static or dynamic model, the adjustments to delay and frequency are intended to maximize the energy (or magnitude) value. With each iteration of the method, the method attempts to improve the energy value.

The following is a description of one embodiment of a dynamic model based upon an extended Kalman filter that can be used to facilitate an energy based tracking loop as described above.

I. Model

A. State Vector

The state vector for the kth block of correlation values is specified as:

$$x_k = [r_k, v_k, a_k]^t, \ a_k = 10 \log_{10}(A_k) \quad (1)$$

where [•]' denotes vector transpose, $v_\kappa$ denotes velocity (frequency) in [m/sec], $r_\kappa$ denotes a pseudorange in [m], and $\alpha\kappa$ ($A\kappa$) denotes the signal amplitude in [dB] (Volts) all at the end of the $\kappa$th block. The block interval is T sec.

The state vector is updated according to a constant velocity, constant signal amplitude, random walk type model:

$$x_{k+1} = \Phi x_k + w_k, \ \Phi = \begin{bmatrix} 1 & T & 0 \\ 0 & 1 & 0 \\ 0 & 0 & 1 \end{bmatrix} \quad (2)$$

with the process noise is modeled as:

$$w_k = \begin{bmatrix} \overline{\alpha}_k \frac{T^2}{2} \\ \overline{\alpha}_k T \\ \overline{a}_k \end{bmatrix} \stackrel{IID}{\sim} \mathcal{N}(0, Q), \ Q = \begin{bmatrix} \sigma_\alpha^2 \frac{T^4}{4} & \sigma_\alpha^2 \frac{T^3}{2} & 0 \\ \sigma_\alpha^2 \frac{T^3}{2} & \sigma_\alpha^2 T^2 & 0 \\ 0 & 0 & \sigma_a^2 \end{bmatrix} \quad (3)$$

where $$\sigma_{\frac{2}{\alpha}} \text{ and } \sigma_{\frac{2}{a}}$$

are variances associated with white, zero mean, discrete time random acceleration and random signal-amplitude-change terms $\overline{\alpha}_\kappa$ and $\overline{a}_\kappa$, respectively. Also, N(μ, K) denotes the normal distribution of specified mean and covariance. Lastly, 0 denotes a column vector of zeros of appropriate dimension.

An alternative, constant-acceleration model may also be considered. Here, the state vector is augmented to include an acceleration term:

$$x_k = [r_k, v_k, \alpha_k, a_k]', \ \Phi = \begin{bmatrix} 1 & T & \frac{1}{2}T^2 & 0 \\ 0 & 1 & T & 0 \\ 0 & 0 & 1 & 0 \\ 0 & 0 & 0 & 1 \end{bmatrix} \quad (4)$$

with the process noise is modeled as:

$$w_k = \begin{bmatrix} \overline{\alpha}_k \frac{T^2}{2} \\ \overline{\alpha}_k T \\ \overline{\alpha}_k \\ \overline{a}_k \end{bmatrix} \stackrel{IID}{\sim} \mathcal{N}(0, Q), \quad (5)$$

$$Q = \begin{bmatrix} \sigma_\alpha^2 \frac{T^4}{4} & \sigma_\alpha^2 \frac{T^a}{2} & \sigma_\alpha^2 \frac{T^a}{2} & 0 \\ \sigma_\alpha^2 \frac{T^3}{2} & \sigma_\alpha^2 T^2 & \sigma_\alpha^2 T & 0 \\ \sigma_\alpha^2 \frac{T^2}{2} & \sigma_\alpha^2 T & \sigma_\alpha^2 & 0 \\ 0 & 0 & 0 & \sigma_a^2 \end{bmatrix}$$

where $\overline{\alpha}_\kappa$ is an unmodeled acceleration term modeled as a realization of a zero mean, white random process of variance $$\sigma_{\frac{2}{\alpha}}.$$

B. Measurement Vector

The measurement vector for the kth block is defined as:

$$z_k = [z_k^{EL}, z_k^{HL}, z_k^P]^t \quad (6)$$

where $z_k^{EL}$ is an early-minus-late delay type measurement, $z_k^{HL}$ is a high-minus-low frequency type measurement, and $z_k^P$ is a prompt signal amplitude type measurement. In the current context, the measurements are a nonlinear function of the state vector:

$$z_k = h(x_k) + n_k \quad (7)$$

where $v_\kappa$ is the measurement noise, and h: $R^{3\times 1} \to R^{3\times 1}$ is a nonlinear mapping with $R^{3\times 1}$ is the set of real, three element column vectors.

Two possible forms of this nonlinearity are now described.

B.1 EGY COP Based Measurements

The mean of the early-delay-minus-late-delay measurement is approximately linear in pseudorange over the interval $r_k^a \pm \Delta_r$ where $\Delta_r$ is the spacing between correlation vector delays, and $r_k^a$ is the prompt acquisition range for the kth block. Likewise, the mean of the high-frequency-minus-low-frequency measurements is approximately linear in frequency over an interval $v_k^a \pm \Delta_v$, $\Delta_v < \delta$ where δ is the high/low frequency (or velocity) offset, and $v_k^a$ is the acquisition velocity associated with the kth block. The dependence of the mean of these two measurements on signal amplitude is well approximated by second order polynomials as is the prompt measurement. Thus:

$$h(x_k) = \begin{bmatrix} h_0(x_k) \\ h_1(x_k) \\ h_2(x_k) \end{bmatrix} \approx \quad (8)$$

$$\overline{h}(x_k) = \begin{bmatrix} (r_k - r_k^a) \sum_{i=0}^{N_0} \eta_i a_k^i \\ (v_k - v_k^a) \sum_{i=0}^{N_1} \zeta_i a_k^i \\ \sum_{i=0}^{N_2} \psi_i a_k^i \end{bmatrix} \approx h(\bar{x}_k) + H_k(x_k - \bar{x}_k)$$

-continued $$H_k = \frac{\partial h}{\partial x'}\bigg|_{x=x_k} = \begin{bmatrix} \sum_{i=0}^{N_0} \eta_i a_k^i & 0 & (r_k - r_k^a)\sum_{i=0}^{N_0} i\eta_i a_k^{i-1} \\ 0 & \sum_{i=0}^{N_1} \zeta_i a_k^i & (v_k - v_k^a)\sum_{i=0}^{N_1} i\zeta_i a_k^{i-1} \\ 0 & 0 & \sum_{i=0}^{N_2} i\psi_i a_k^{i-1} \end{bmatrix} \quad (9)$$

where $x_k$ and $\tilde{x}_k$ are "close" in a Euclidean sense. Strictly speaking, acquisition frequency errors affect the pseudorange measurement, acquisition range errors affect the frequency measurement, and frequency and range errors both affect the signal amplitude measurement. The polynomial coefficients are designed to take small errors into account.

The measurement noise is modeled as a realization of a discrete time, zero mean, temporally uncorrelated, normal random process with covariance generally dependent on the state vector. Monte-Carlo simulations have led to the following observations.

The individual measurement noise components are almost mutually uncorrelated implying a diagonal measurement noise covariance.

The individual measurement noise variances are slowly changing, approximately linear functions of signal amplitude in dB while being essentially independent of pseudorange and velocity.

Mathematically, $$n_k \sim \mathcal{N}(0, R_k), \; R_k = \begin{bmatrix} \sigma^2_{EL_k} & 0 & 0 \\ 0 & \sigma^2_{HL_k} & 0 \\ 0 & 0 & \sigma^2_{P_k} \end{bmatrix} \quad (10)$$

where:

$$\sigma^2_{EL_k} \approx \tilde{\sigma}^2_{EL_k} = \sum_{i=0}^{K_0} \lambda_i a_k^i \quad (11)$$

$$\sigma^2_{HL_k} \approx \tilde{\sigma}^2_{HL_k} = \sum_{i=0}^{K_1} \beta_i a_k^i$$

$$\sigma^2_{P_k} \approx \tilde{\sigma}^2_{P_k} = \sum_{i=0}^{K_2} \gamma_i a_k^i$$

B.2 HSS COP Based Measurements
B.2.a Prompt. It will prove convenient to write the Early-Late delay detector in matrix notation:

$$z^P = \sum_{\ell=0}^{L-1} u_\ell^H B u_\ell \quad (12)$$

$$u_\ell \stackrel{IID}{\sim} \mathcal{N}(\mu_u, K_u), \; \mu_u = AG(r - r^a)e(v - v^a), \; K_u = \sigma^2 I$$

$$G(r - r^a) = 1 - \frac{|r - r^a|}{r_c}, \; |r - r^a| \le r_c$$

$$B = e(0)e^H(0) = 11^H$$

$$e(v) = \left[1 e^{j2\pi\frac{v}{\lambda}T^a}, \ldots, e^{j2\pi\frac{v}{\lambda}[N-1]T^a}\right]^T$$

$$1 = [1, \ldots, 1]^T$$

where, without loss of generality, a common time-variant phase term $\{e^{j\Theta e}\}$ on the mean components is set to zero, and I denotes the identity matrix. Moreover, A is the ERAM signal amplitude, $\sigma^2$ is the ERAM noise variance, and $(\bullet)^H$ denotes the conjugate transpose operation. Lastly, without loss or generality, a common time-variant phase term $\{e^{j\Theta e}\}$ on the mean components is set to zero.

The Central Limit Theorem justifies the claim that $z^P$ is asymptotically normal with mean and variance found from the Appendix:

$$z^P \sim \mathcal{N}(\mu_P, \sigma_P^2) \quad (13)$$

$$\mu_P = L(A^2 G^2(r - r^a)J^2(v - v^a) + N\sigma^2)$$

$$\sigma_P^2 = LN\sigma^2(2A^2 G^2(r - r^a)J^2(v - v^a) + N\sigma^2)$$

$$J(v - v^a) = \begin{cases} N & v = v^a \\ \dfrac{\sin\left(\pi\dfrac{[v - v^a]}{\lambda}T^a N\right)}{\sin\left(\pi\dfrac{[v - v^a]}{\lambda}T^a\right)} & v \ne v^a \end{cases}$$

where the fact that:

$$|e^H(v')e(v'')|^2 = e^H(v')e(v'')e^H(v'')e(v') \quad (14)$$

$$= \left[\frac{\sin\left(\pi\dfrac{[v'' - v']}{\lambda}T^a N\right)}{\sin\left(\pi\dfrac{[v'' - v']}{\lambda}T^a\right)}\right]^2$$

has been used.

B.2.b Early-Late $$z^{EL} = \sum_{\ell=0}^{L-1} y_\ell^H B y_\ell \quad (15)$$

$$y_\ell \stackrel{IID}{\sim} \mathcal{N}(\mu_y, K_y)$$

$$\mu_y = A[G(r - r^{aE})e^T(v - v^a) \; G(r - r^{aL})e^T(v - v^a)]^T$$

$$K_y = \sigma^2 \begin{bmatrix} I & \rho I \\ \rho I & I \end{bmatrix}, \; \rho = 1 - \frac{|r^{aE} - r^{aL}|}{r_c}$$

$$B = \begin{bmatrix} e(0)e^H(0) & 0 \\ 0 & -e(0)e^H(0) \end{bmatrix} = \begin{bmatrix} 11^H & 0 \\ 0 & -11^H \end{bmatrix}$$

where 0 is a matrix of zeros. The Early-Late measurement is distributed as:

$$z^{EL} \sim \mathcal{N}(\mu_{EL}, \sigma_{EL}^2) \quad (16)$$

$$\mu_{EL} = LA^2 J^2(v - v^a)[G^2(r - r^{aE}) + G^2(r - r^{aL})]$$

$$\sigma_{EL}^2 = L\left(2A^2 N\sigma^2 J^2(v - v^a)\begin{bmatrix} G^2(r - r^{aE}) + G^2(r - r^{aL}) - \\ 2\rho G(r - r^{aE})G(r - r^{aL}) \end{bmatrix} + 2N^2\sigma^4(1 - \rho^2)\right)$$

B.2.c. High-Low.

$$z^{HL} = \sum_{\ell=0}^{L-1} v_\ell^H B v_\ell \quad (17)$$

$$v_\ell \stackrel{IID}{\sim} \mathcal{N}(\mu_v, K_v)$$

$$\mu_v = AG(r - r^a P)[e^T(v - v^a) \ e^T(v - v^a)]^T$$

$$K_v = \sigma^2 \begin{bmatrix} I & I \\ I & I \end{bmatrix}$$

$$B = \begin{bmatrix} e(\delta_v)e^H(\delta_v) & 0 \\ 0 & -e(-\delta_v)e^H(-\delta_v) \end{bmatrix}$$

The High-Low measurement is distributed as:

$$z^{HL} \sim \mathcal{N}(\mu_{HL}, \sigma_{HL}^2) \quad (18)$$

$$\mu_{HL} = LA^2 G^2(r - r^a P)[J^2(v - v^a - \delta_v) - J^2(v - v^a + \delta_v)]$$

$$\sigma_{HL}^2 =$$

$$L \left( 2A^2 G^2(r - r^a P)\sigma^2 \begin{bmatrix} NJ^2(v - v^a - \delta_v) + NJ^2(v - v^a + \delta_v) - \\ 2J(v - v^a - \delta_v)J(v - v^a + \delta_v)J(2\delta_v) \end{bmatrix} + 2\sigma^4[N^2 - J^2(2\delta_v)] \right)$$

Thus, the nonlinear function related the state vector to the (noiseless) measurement vector is given as:

$$h(x_k) = \begin{bmatrix} LA_k^2 J^2(v_k - v_k^a)[G^2(r_k - r_k^{aE}) - G^2(r_k - r_k^{aL})] \\ LA_k^2 G^2(v_k - v_k^{aP}) \begin{bmatrix} J^2(v_k - v_k^a - \delta_v) - \\ J^2(v_k - v_k^a + \delta_v) \end{bmatrix} \\ L[A_k^2 G^2(r_k - r_k^a)J^2(v_k - v_k^a) + N\sigma^2] \end{bmatrix} \quad (19)$$

To determine the gradient $H_K$, consider the following derivates:

$$\frac{d}{dr}G^2(r - r^a) = 2\frac{d}{dr}G(r - r^a) \quad (20)$$

$$= \begin{cases} -\frac{2}{r_c}G(r - r^a), & r \geq r^a \\ \frac{2}{r_c}G(r - r^a), & r < r^a \end{cases}$$

$$\frac{d}{dv}J^2(v - v^a) = 2\frac{d}{dv}J(v - v^a)$$

$$= \frac{2J(v - v^a)}{\sin\left(\pi\frac{[v - v^a]}{\lambda}T^a\right)} \times$$

$$\begin{bmatrix} \frac{d}{dv}\sin\left(\pi\frac{[v - v^a]}{\lambda}T^a N\right) - \\ J(v - v^a)\frac{d}{dv}\sin\left(\pi\frac{[v - v^a]}{\lambda}T^a\right) \end{bmatrix}$$

$$= \frac{2\pi T^a J(v - v^a)}{\lambda \sin\left(\pi\frac{[v - v^a]}{\lambda}T^a\right)} \begin{bmatrix} N\cos\left(\pi\frac{[v - v^a]}{\lambda}T^a N\right) - \\ J(v - v^a) \times \\ \cos\left(\pi\frac{[v - v^a]}{\lambda}T^a\right) \end{bmatrix},$$

$$v \neq v^a$$

-continued $$\frac{d}{da}A^2 = \frac{d}{da}10^{\frac{a}{5}} = \frac{\ln(10)}{5}A^2$$

where it is noted that for $$v = v^a, \ \frac{d}{dv}J^2(v - v^a) = 0.$$

The individual elements of the gradient can be written as:

$$H_k^{(1,1)} = LA_k^2 J^2(v_k - v_k^a)\left[\frac{d}{dr}G^2(r - r_k^{aE})\bigg|_{r=r_k} - \frac{d}{dr}G^2(r - r_k^{aL})\bigg|_{r=r_k}\right] \quad (21)$$

$$H_k^{(1,2)} = LA_k^2 \frac{d}{dv}J^2(v - v_k^a)\bigg|_{v=v_k} [G^2(r_k - r_k^{aE}) - G^2(r_k - r_k^{aL})]$$

$$H_k^{(1,3)} = L\frac{d}{da}A_k^2\bigg|_{a=a_k} J^2(v_k - v_k^a)[G^2(r_k - r_k^{aE}) - G^2(r_k - r_k^{aL})]$$

$$H_k^{(2,1)} = LA_k^2 \frac{d}{dr}G^2(r - r_k^{aP})\bigg|_{r=r_k} [J^2(v_k - v_k^a - \delta_v) - J^2(v_k - v_k^a + \delta_v)]$$

$$H_k^{(2,2)} = LA_k^2$$

$$G^2(r_k - r_k^{aP})\left[\frac{d}{dv}J^2(v - v_k^a - \delta_v)\bigg|_{v=v_k} - \frac{d}{dv}J^2(v - v_k^a + \delta_v)\bigg|_{v=v_k}\right]$$

$$H_k^{(2,3)} = L\frac{d}{da}A_k^2\bigg|_{a=a_k} G^2(r_k - r_k^{aP})[J^2(v_k - v_k^a - \delta_v) -$$

$$J^2(v_k - v_k^a + \delta_v)]$$

$$H_k^{(3,1)} = LA_k^2 \frac{d}{dr}G^2(r - r_k^a)\bigg|_{r=r_k} J^2(v_k - v_k^a)$$

$$H_k^{(3,2)} = LA_k^2 G^2(r_k - r_k^a)\frac{d}{dv}J^2(v - v_k^a)\bigg|_{v=v_k}$$

$$H_k^{(3,3)} = L\frac{d}{da}A_k^2\bigg|_{a=a_k} G^2(r_k - r_k^a)J^2(v_k - v_k^a)$$

where $H_k^{(i,j)}$ is the element of $H_k$ corresponding to the jth column.

II. Filter

The extended Kalman filter (EKF) used to estimate the state vector for each block is summarized below:
Initialization:

$\hat{x}_{-1|-1}$: derived from measurements obtained over several blocks. (22)

$P_{-1|-1}$: derived from covariance based on $\hat{a}_{-1|-1}$.

Prediction:

$$\hat{x}_{k|k-1} = \Phi \hat{x}_{k-1|k-1} \quad (23)$$

Prediction Covariance:

$$P_{k|k-1} = \Phi P_{k-1|k-1}\Phi' + Q \tag{24}$$

Kalman Gain:

$$K_k = P_{k|k-1}H_k'(H_k P_{k|k-1}H_k' + R_k)^{-1} \tag{25}$$

Correction/Estimation:

$$\hat{x}_{k|k} = \hat{x}_{k|k-1} + K_k[z_k - h(\hat{x}_{k|k-1})] \tag{26}$$

Estimation Covariance:

$$\hat{P}_{k|k} = (I - K_k H_k) P_{k|k-1} \tag{27}$$

In support of the foregoing description, the following is a description of the first and second order statistics of a Hermitian Quadratic Form.

Consider a complex normal random column vector y of mean $\mu_y$ and covariance $\Sigma_y$:

$$y \sim CN(\mu_y, \Sigma_y) \tag{28}$$

Consider the indefinite quadratic form:

$$z = y^H B y, \quad B^H = B \tag{29}$$

where $(\bullet)^H$ denotes the conjugate tranpose, and B is a Hermitian, generally indefinite matrix.

The mean and variance of z are sought:

$$\mu_z = E[z], \quad \sigma_z^2 = E[(z - \mu_z)^2] = E[z^2] - \mu_z^2 \tag{30}$$

where $E[\bullet]$ denotes the expected value. The mean may be written simply as:

$$\mu_z = E[y^H B y] = tr(B \cdot E[yy^H]) = \mu_y^H B \mu_y + tr(B\Sigma_y) \tag{31}$$

where $tr(\bullet)$ denotes the trace operation. To compute the variance, first write the random vector in terms of its means and a zero-mean, random component:

$$y = \mu_y + w. \tag{32}$$

Now, consider the non-central second moment:

$$\begin{aligned}
E[z^2] &= E[(y^H B y)^2] \\
&= E[([\mu_y^H + w^H]B[\mu_y + w])^2] \\
&= E[(\mu_y^H B \mu_y + w^H B \mu_y + \mu_y^H B w + w^H B w)^2] \\
&= (\mu_y^H B \mu_y)^2 + 2\mu_y^H B \mu_y tr(B\Sigma_y) + 2\mu_y^H B \Sigma_y B \mu_y + \\
&\quad E[(w^H B w)^2]
\end{aligned} \tag{33}$$

-continued $$= (\mu_y^H B \mu_y)^2 + 2\mu_y^H B \mu_y tr(B\Sigma_y) + 2\mu_y^H B \Sigma_y B \mu_y + tr^2(B\Sigma_y) + tr([B\Sigma_y]^2).$$

using (30), $$\begin{aligned}
\sigma_z^2 &= E[z^2] - (\mu_y^H B \mu_y)^2 - 2\mu_y^H B \mu_y tr(B\Sigma_y) - tr^2(B\Sigma_y) \\
&= 2\mu_y^H B \Sigma_y B \mu_y + tr([B\Sigma_y]^2)
\end{aligned} \tag{34}$$

In further support of the foregoing description, the following provides a description of the procedure used to invert a 3×3 matrix. Consider an arbitrary three-by-three, real matrix $A \in R^{3 \times 3}$. This description provides an explicit formula for the inverse of such a matrix. The inverse of any N×N non-singular matrix may be expressed in terms of its adjoint and determinant:

$$A^{-1} = \frac{adj(A)}{\det(A)} \tag{35}$$

$$adj(A) = B: \; b_{ij} = (-1)^{i+j} \det(A_{ij})$$

$$\det(A) = \sum_{i=1}^{N} (-1)^{i+j} a_{ij} \det(A_{ij}), \; \forall \; j \in \{1, 2, \ldots, N\}$$

where $a_{ij}$ is the element of A corresponding to the ith row and the jth column, and $A_{ij}$ is the sub-matrix with the ith row and the jth column of A deleted.

It turns out that for a 2×2 matrix, $$A_2 = \begin{bmatrix} a_{11} & a_{12} \\ a_{21} & a_{22} \end{bmatrix} \tag{36}$$

its determinant can be written explicitly as:

$$\det(A_2) = a_{11}a_{22} - a_{12}a_{21} \tag{37}$$

while for a 3×3 matrix, $$A_3 = \begin{bmatrix} a_{11} & a_{12} & a_{13} \\ a_{21} & a_{22} & a_{23} \\ a_{31} & a_{32} & a_{33} \end{bmatrix} \tag{38}$$

its determinant can be written explicitly as:

$$\det(A_3) = a_{11}a_{22}a_{33} + a_{12}a_{23}a_{31} + a_{13}a_{21}a_{32} - a_{11}a_{23}a_{32} - a_{12}a_{21}a_{33} - a_{13}a_{22}a_{31} \tag{39}$$

In case of interest, the matrix $A_3$ is symmetric:

$$a_{ij} = a_{ji}, \; \forall i \in \{1,2,\ldots,N\}, \; \forall j \in \{1,2,\ldots,N\} \tag{40}$$

In this case, it can be shown that:

$$A_3^{-3} = \frac{1}{\det(A_3)} \begin{bmatrix} a_{22}a_{33} - a_{23}^2 & -(a_{12}a_{33} - a_{23}a_{13}) & a_{12}a_{23} - a_{13}a_{22} \\ -(a_{12}a_{33} - a_{23}a_{13}) & a_{11}a_{33} - a_{13}^2 & -(a_{11}a_{23} - a_{12}a_{13}) \\ a_{12}a_{23} - a_{13}a_{22} & -(a_{11}a_{23} - a_{12}a_{13}) & a_{11}a_{22} - a_{12}^2 \end{bmatrix} \tag{41}$$

$$\det(A_3) = a_{11}a_{22}a_{33} + 2a_{12}a_{23}a_{13} - a_{11}a_{23}^2 - a_{12}^2 a_{33} - a_{13}^2 a_{22}$$

While the foregoing is directed to embodiments of the present invention, other and further embodiments of the invention may be devised without departing from the basic scope thereof, and the scope thereof is determined by the claims that follow.

What is claimed is:

1. A method of tracking a signal comprising:
   (a) correlating, based on a hypothesis, a digital signal with a code at a plurality of frequencies and at least one delay to produce correlation results;
   (b) measuring an energy value of the correlation results; and
   (c) adjusting at least one of the frequency or delay in response to the measured energy value; and
   wherein the energy value is a measured energy vector comprising measured quantities of a frequency and a delay; and
   wherein the measured quantities are used to update states of an extended Kalman filter.

2. The method of claim 1 further comprising:
   (d) repeating steps (a), (b), (c) and (d) to improve the measured energy value.

3. The method of claim 1 further comprising:
   tracking, over time the measured energy values of the correlation results; and
   improving the magnitude of the energy values using adjustments of at least one of the frequency or delay.

4. The method of claim 1 wherein the measured energy value form an energy vector comprising energy from a plurality of delays and frequencies.

5. The method of claim 1 wherein the adjusting step is performed using a dynamic model.

6. The method of claim 5 wherein the dynamic model is an extended Kalman filter.

7. The method of claim 1 wherein the correlating step is performed using a plurality of correlators measuring a correlation result having delay as a variable, a plurality of correlators measuring a correlation result having frequency as a variable, and a punctual correlator.

8. The method of claim 7 wherein the correlators define a multi-dimensional correlation space representing an energy amount within the correlation result.

9. The method of claim 7 wherein the plurality of correlators measuring a correlation result having delay as a variable comprise an early correlator having a delay that is earlier than a delay of the punctual correlator and a late correlator having a delay that is later than a delay of the punctual correlator, and wherein the plurality of correlators measuring a correlation result having frequency as a variable comprise a high correlator having a frequency that is higher than a frequency of the punctual correlator and a low correlator having a frequency that is lower than a frequency of the punctual correlator.

10. A method of tracking a signal comprising:
    (a) correlating, based on a hypothesis, a digital signal with a code at a plurality of frequencies and at least one delay to produce correlation results;
    (b) producing a measured energy value of the correlation results; and
    (c) updating a frequency, and delay states of an extended Kalman filter in response to the measured energy value.

11. The method of claim 10 further comprising:
    (d) repeating steps (a), (b), (c) and (d) to improve the magnitude of the measured energy value.

12. The method of claim 10 further comprising:
    tracking, over time, the measured energy value of the correlation results; and
    improving the magnitude of the energy value using adjustments of at least one of the frequency or delay.

13. The method of claim 10 wherein the correlating step is performed using a plurality of correlators measuring a correlation result having delay as a variable, a plurality of correlators measuring a correlation result having frequency as a variable, and a punctual correlator.

14. The method of claim 13 wherein the correlators define a multi-dimensional correlation space representing an energy amount within the correlation result.

15. The method of claim 13 wherein the plurality of correlators measuring a correlation result having delay as a variable comprise an early correlator having a delay that is earlier than a delay of the punctual correlator and a late correlator having a delay that is later than a delay of the punctual correlator, and wherein the plurality of correlators measuring a correlation result having frequency as a variable comprise a high correlator having a frequency that is higher than a frequency of the punctual correlator and a low correlator having a frequency that is lower than a frequency of the punctual correlator.

16. Apparatus for tracking a signal comprising:
    (a) a plurality of correlators for correlating, based on a hypothesis, a digital signal with a code at a plurality of frequencies and at least one delay to produce correlation results;
    (b) a discriminator for measuring an energy value of the correlation results;
    (c) an extended Kalman filter, wherein the frequency, and delay states of the extended Kalman filter are updated in response to the measured energy value.

17. The apparatus of claim 16 wherein the extended Kalman filter tracks, over time, the measured energy value of the correlation results; and improves the magnitude of the energy value using adjustments of at least one of the frequency or delay.

18. The apparatus of claim 17 wherein the measured energy forms an energy vector comprising energy from a plurality of delays and frequencies.

19. The apparatus of claim 17 wherein the plurality of correlators comprises a plurality of correlators measuring a correlation result having delay as a variable, a plurality of correlators measuring a correlation result having frequency as a variable, and a punctual correlator.

20. The apparatus of claim 19 wherein the plurality of correlators define a multi-dimensional correlation space representing an energy amount within the correlation results.

21. The apparatus of claim 19 wherein the plurality of correlators measuring a correlation result having delay as a variable comprise an early correlator having a delay that is earlier than a delay of the punctual correlator and a late correlator having a delay that is later than a delay of the punctual correlator, and wherein the plurality of correlators measuring a correlation result having frequency as a variable comprise a high correlator having a frequency that is higher than a frequency of the punctual correlator and a low correlator having a frequency that is lower than a frequency of the punctual correlator.

22. The apparatus of claim 17 wherein the energy value is a measured energy vector comprising a frequency quantity and a delay quantity.

23. The method of claim 1, wherein correlating, based on a hypothesis, a digital signal with a code at a plurality of frequencies and at least one delay to produce correlation results further comprises:

simultaneously correlating the digital signal with the code at the plurality of frequencies at least one delay to provide correlation results.

24. The method of claim 10, wherein correlating, based on a hypothesis, a digital signal with a code at a plurality of frequencies and at least one delay to produce correlation results further comprises:
    simultaneously correlating the digital signal with the code at the plurality of frequencies at least one delay to provide correlation results.

25. The apparatus of claim 16 wherein the plurality of correlators simultaneously correlate at the plurality of frequencies and at least one delay to produce correlation results.

26. The method of claim 1, wherein correlating, based on a hypothesis, a digital signal with a code at a plurality of frequencies and at least one delay to produce correlation results further comprises:
    correlating the digital signal with the code at the plurality of centered frequencies at least one delay to provide correlation results.

27. The method of claim 10, wherein correlating, based on a hypothesis, a digital signal with a code at a plurality of frequencies and at least one delay to produce correlation results further comprises:
    correlating the digital signal with the code centered at the plurality of frequencies at least one delay to provide correlation results.

28. The apparatus of claim 16 wherein the plurality of correlators correlate the digital signal centered at the plurality of frequencies and at least one delay to produce correlation results.

29. The method of claim 1, wherein correlating, based on a hypothesis, a digital signal with a code at a plurality of frequencies and at least one delay to produce correlation results further comprises:
    simultaneously correlating the digital signal with the code at a plurality of frequency ranges, wherein each of the plurality of frequency ranges comprises particular ones of the plurality of frequencies at least one delay to provide correlation results.

30. The method of claim 10, wherein correlating, based on a hypothesis, a digital signal with a code at a plurality of frequencies and at least one delay to produce correlation results further comprises:
    simultaneously correlating the digital signal with the code at a plurality of frequency ranges, wherein each of the plurality of frequency ranges comprises particular ones of the plurality of frequencies at least one delay to provide correlation results.

31. The apparatus of claim 16 wherein the plurality of correlators simultaneously correlate at a plurality of frequency ranges, wherein each of the plurality of frequency ranges comprises particular ones of the plurality of frequencies and at least one delay to produce correlation results.

* * * * *